(12) United States Patent
Akashi (10) Patent No.: US 9,439,296 B2
(45) Date of Patent: Sep. 6, 2016

(54) ELECTRICAL EQUIPMENT, PRODUCTION METHOD THEREOF AND DESIGN METHOD OF ELECTRICAL EQUIPMENT

(71) Applicant: SHINDENGEN ELECTRIC MANUFACTURING CO., LTD., Tokyo (JP)

(72) Inventor: Tomoya Akashi, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 238 days.

(21) Appl. No.: 14/376,847

(22) PCT Filed: Aug. 30, 2013

(86) PCT No.: PCT/JP2013/073338
§ 371 (c)(1),
(2) Date: Aug. 6, 2014

(87) PCT Pub. No.: WO2015/029219
PCT Pub. Date: Mar. 5, 2015

(65) Prior Publication Data
US 2015/0062845 A1    Mar. 5, 2015

(51) Int. Cl.
| | | |
|---|---|---|
| *H05K 5/00* | (2006.01) | |
| *H05K 3/28* | (2006.01) | |
| *G06F 17/50* | (2006.01) | |
| *H05K 7/04* | (2006.01) | |
| *H05K 5/06* | (2006.01) | |

(52) U.S. Cl.
CPC ........... *H05K 3/284* (2013.01); *G06F 17/5068* (2013.01); *H05K 5/064* (2013.01); *H05K 7/04* (2013.01); *G06F 2217/41* (2013.01); *H05K 2203/1327* (2013.01)

(58) Field of Classification Search
CPC ........ H05K 5/06; H05K 5/062; H05K 5/064; H05K 5/065; H05K 3/284
USPC .......................................................... 361/752
See application file for complete search history.

(56) References Cited

U.S. PATENT DOCUMENTS 4,628,146 A * 12/1986 Schmotz ............... H01L 23/315
                                                                            174/521
5,831,369 A * 11/1998 Furbacher ................ H03H 9/08
                                                                            310/313 R (Continued)

FOREIGN PATENT DOCUMENTS

| JP | 53-161260 U | 12/1978 |
|---|---|---|
| JP | 55-58052 U | 4/1980 |
| JP | 2010-056351 | 3/2010 |
| JP | 2010-133400 | 6/2010 |

OTHER PUBLICATIONS

International Preliminary Report on Patentability (Chapter I) for PCT/JP2013/073338 dated Mar. 1, 2016.

(Continued)

*Primary Examiner* — Adrian S Wilson
(74) *Attorney, Agent, or Firm* — Ladas & Parry, LLP (57) ABSTRACT

Electrical equipment 1 includes a chassis 2 that has a bottom portion 3 and side portions 4 and 5, a printed circuit board 10 that is stored in the chassis 2 such that one principal surface 10*a* faces an inner surface 3*a* of the portion 3, a sealing resin 20 that is filled in internal space S formed by the chassis 2 and the circuit board 10, embeds the circuit board 10, and a flow suppression portion 8 that decreases a drift velocity of the resin 20 pressed into the space S through the resin injection hole 11, and that is provided in at least part of region A from a position immediately below the hole 11 in the inner surface 3*a* to an inner surface 4*a* of a side portion 4 closest to the hole 11 out of the side portions 4 and 5.

15 Claims, 7 Drawing Sheets

(56) References Cited

U.S. PATENT DOCUMENTS

| | | | | |
|---|---|---|---|---|
| 7,288,847 B2* | 10/2007 | Ruben | ............... | H05K 3/0064 |
| | | | | 257/666 |
| 7,352,070 B2* | 4/2008 | Ellis | ............... | H01L 21/563 |
| | | | | 257/778 |
| 7,868,903 B2* | 1/2011 | Wendler | ............... | G09F 9/33 |
| | | | | 345/204 |
| 2005/0057849 A1* | 3/2005 | Twogood | ............ | G11B 33/022 |
| | | | | 360/97.12 |

OTHER PUBLICATIONS

Written Opinion of the International Searching Authority for PCT/JP2013/073338 mailed on Nov. 26, 2013 and its English translation provided by WIPO.

International Search Report for PCT/JP2013/073338 mailed on Nov. 26, 2013.

* cited by examiner

ELECTRICAL EQUIPMENT, PRODUCTION METHOD THEREOF AND DESIGN METHOD OF ELECTRICAL EQUIPMENT

CROSS-REFERENCE TO RELATED APPLICATIONS

This application is the U.S. National Stage of International Patent Application No. PCT/ JP2013/073338 filed on Aug. 30, 2013, the disclosure of which is hereby incorporated by reference in its entirety.

TECHNICAL FIELD

The present invention relates to electrical equipment, a production method thereof and a design method of the electrical equipment.

BACKGROUND ART

In the related art, there is known electrical equipment that stores a printed circuit board mounting electronic parts in a chassis (Patent Literature 1). In such electrical equipment, the printed circuit board and the electronic parts stored in the chassis may be embedded using a resin such as a hard potting resin for vibration resistance, heat radiation and waterproof, and so on.

In a resin sealing process, a method of pressing a resin into a space formed by a printed circuit board and a chassis (which may be simply referred to as "internal space" below) is adopted such that air bubbles do not remain in the internal space. In this method, a through-hole is provided in the central portion of the printed circuit board as a resin injection hole, a resin injection nozzle is applied to this through-hole and the resin is pressed into the internal space.

After the resin pressed from the resin injection hole into the internal space reaches the side portion of the chassis, it spreads over the upper side of the printed circuit board through the gap between the edge side of the printed circuit board and the side portion of the chassis. When the resin filling of the internal space is completed, the resin injection nozzle is removed from the resin injection hole and the resin is dropped from above the printed circuit board to cover the upper surface of the printed circuit board with the resin. Thus, the printed circuit board and the electronic parts are embedded with the resin.

CITATION LIST

Patent Literature

Patent Literature 1: Japanese Patent Laid-Open No. 2010-133400

SUMMARY OF INVENTION

Technical Problem

However, actually, there is a case where it is difficult to provide a resin injection hole on the central portion of a printed circuit board for certain reasons of the arrangement of electronic parts. Moreover, even if the resin injection hole is provided in the central portion of the printed circuit board, there is a case where a chassis has a substantially rectangular shape in plan view and the side portion of the chassis is not in a certain distance from the resin injection hole.

Since the timing at which a resin springs out from the internal space varies every side of the printed circuit board, filling a resin in the internal space without generating air bubbles is not actually easy.

For example, in a case where the chassis has a substantially rectangular shape in plan view, a resin springs out at an earlier timing from the gap between the chassis side portion on the long side side and the edge side of the printed circuit board than the gap between the chassis side portion on the short side side and the edge side of the printed circuit board. Further, the ejected resin covers the upper surface of the printed circuit board and is attached to the point of a resin injection nozzle. As a result, there is a case where it is not possible to continue the resin injection.

Moreover, even if it is possible to continue the resin injection, before a pressed resin flows in the internal space and reaches the chassis side portion on the short side side, the entire upper surface of the printed circuit board is covered with the resin ejected from the gap on the long side side. As a result, it is not possible to let out the air in the internal space to the outside, and air bubbles remain. Especially, in a case where a resin with high viscosity is used for the purpose of securing the thermal conductivity or the like, the air bubbles are likely to remain.

Here, although the generation of air bubbles can be suppressed in some degree by performing residual heat or degassing, there is a problem of taking time and cost since a new process and a special apparatus are required.

The present invention is made based on the above-mentioned technical recognition, and it is an object to provide electrical equipment and a production method thereof that can suppress the generation of air bubbles in a sealing resin without a new process and a special apparatus.

Solution to Problem

Electrical equipment according to one aspect of the present invention includes: a chassis that has a bottom portion and a plurality of side portions and is opened upward; a printed circuit board in which a resin injection hole that penetrates in a thickness direction is provided, and that is stored in the chassis such that one principal surface faces an inner surface of the bottom portion; a sealing resin that is filled in an internal space formed by the chassis and the printed circuit board, coats the other principal surface of the printed circuit board and embeds the printed circuit board; and a flow suppression portion that decreases a drift velocity of the sealing resin pressed into the internal space through the resin injection hole before the sealing resin is hardened, and that is provided in at least part of a region from a position immediately below the resin injection hole in the inner surface of the bottom portion to an inner surface of a side portion closest to the resin injection hole among the plurality of side portions.

Moreover, in the electrical equipment, the electrical equipment may have a feature that a plurality of ribs that are in contact with the inner surface of the side portion closest to the resin injection hole and extend to an upper side of the printed circuit board along a direction in which the side portion stands from the bottom portion are provided as the flow suppression portion.

Moreover, in the electric equipment, the interval between the ribs may become wider with increasing distance from the resin injection hole.

Moreover, in the electric equipment, the width of the rib may become narrower with increasing distance from the resin injection hole.

Moreover, in the electrical equipment, the chassis may have a substantially rectangular shape in plan view, the resin injection hole may be provided in a central portion of the printed circuit board and the plurality of ribs may be provided in at least one side portion corresponding to a long side among the plurality of side portions of the chassis.

Moreover, in the electrical equipment, a rib that is in contact with the inner surface of the bottom portion of the chassis and extends along the side portion closest to the resin injection hole may be provided as the flow suppression portion.

Moreover, in the electrical equipment, the rib may have a top portion and an inclination portion that is provided in an opposite side to a position immediately below the resin injection hole and inclines from the top portion toward the inner surface of the bottom portion of the chassis.

Moreover, in the electrical equipment, concavities and convexities formed by surface texturing may be provided in the inner surface of the chassis as the flow suppression portion.

Moreover, in the electrical equipment, an air bubble escape hole that penetrates through the printed circuit board in a thickness direction may be provided near an edge side of the printed circuit board, between the resin injection hole and a side portion different from the side portion closest to the resin injection hole Moreover, in the electrical equipment, the chassis may have a substantially polygonal shape in plan view and the depth of a corner portion of the chassis may be shallower than a central portion of the bottom portion.

Moreover, in the electrical equipment, an electronic part may be mounted on the one principal surface of the printed circuit board and the flow suppression portion may be provided in consideration of the size of the electronic part.

A production method of electrical equipment according to one aspect of the present invention includes: preparing a printed circuit board in which a resin injection hole that penetrates in a thickness direction is provided and an electronic part is mounted on one principal surface; preparing a chassis that has a bottom portion and a plurality of side portions and is opened upward, where a flow suppression portion that decreases a drift velocity of a resin pressed into an internal space, which is formed by the chassis and the printed circuit board when the printed circuit board is stored, through the resin injection hole is provided in at least part of a region from an inner surface of the bottom portion immediately below the resin injection hole to an inner surface of a side portion closest to the resin injection hole among the plurality of side portions; storing the printed circuit board in the chassis such that the one principal surface faces the inner surface of the bottom portion; and a sealing step of pressing a resin through the resin injection hole and hardening the resin after embedding the electronic part and the printed circuit board with the resin.

Moreover, the production method of the electrical equipment may use a chassis in which a plurality of ribs that are in contact with the inner surface of the side portion closest to the resin injection hole in a state where the printed circuit board is stored in the chassis and that stand from the inner surface of the bottom surface to the upper side of the printed circuit board are provided as the flow suppression portion.

A design method of electrical equipment according to one aspect of the present invention includes a chassis that has a bottom portion and a plurality of side portions and is opened upward, a printed circuit board in which a resin injection hole that penetrates in a thickness direction is provided, and that is stored in the chassis such that one principal surface faces an inner surface of the bottom portion, and a sealing resin that is filled in the chassis and embeds the printed circuit board, where a flow suppression portion that decreases a drift velocity of the sealing resin pressed into an internal space, which is formed by the chassis and the printed circuit board when the printed circuit board is stored in the chassis, through the resin injection hole before the sealing resin is hardened, is provided in at least part of a region from the inner surface of the bottom portion immediately below the resin injection hole to an inner surface of a side portion closest to the resin injection hole among the plurality of side portions.

In the design method of the electrical equipment, a plurality of ribs that are in contact with the inner surface of the side portion closest to the resin injection hole and stand from the inner surface of the bottom portion to the upper side of the printed circuit board may be provided as the flow suppression portion.

Advantageous Effect of Invention

In the present invention, a flow suppression portion that decreases the drift velocity of a sealing resin pressed into an internal space through a resin injection hole before the sealing resin is hardened, is provided in at least part of a region from a position immediately below the resin injection hole in an inner surface of a bottom portion of a chassis to an inner surface of a side portion closest to the resin injection hole among a plurality of side portions.

By this means, the timing at which the resin springs out from the gap between the side portion in the closest position to the resin injection hole and an edge side of a printed circuit board is delayed. As a result, the timing at which the resin pressed into the internal space springs out through each of the gaps between a plurality of side portions of the chassis and the edge sides of the printed circuit board is adjusted. That is, the resin pressed into the internal space springs out through each of the gaps between the plurality of side portions of the chassis and the edge sides of the printed circuit board at almost the same timing. As a result, it is possible to avoid the situation that the resin is attached to the point of the resin injection nozzle and the resin injection cannot be continued, and avoid the situation that: the upper surface of the printed circuit board is covered with the resin before the resin filling of the internal space is completed; and air bubbles remain in the internal space.

Therefore, according to the present invention, it is possible to suppress the generation of air bubbles in a sealing resin without a new process and a special apparatus.

BRIEF DESCRIPTION OF DRAWINGS

FIG. 2(*a*) is a cross sectional view along the X-X line in FIG. 1 and FIG. 2(*b*) is a cross sectional view along the Y-Y line in FIG. 1.

DESCRIPTION OF EMBODIMENTS

In the following, embodiments of the present invention are described with reference to the drawings. Also, the same reference numeral is assigned to components having an equivalent function in each figure, and detailed explanation of the component of the same reference numeral is not repeated in principle.

(First Embodiment)

Figure 1:
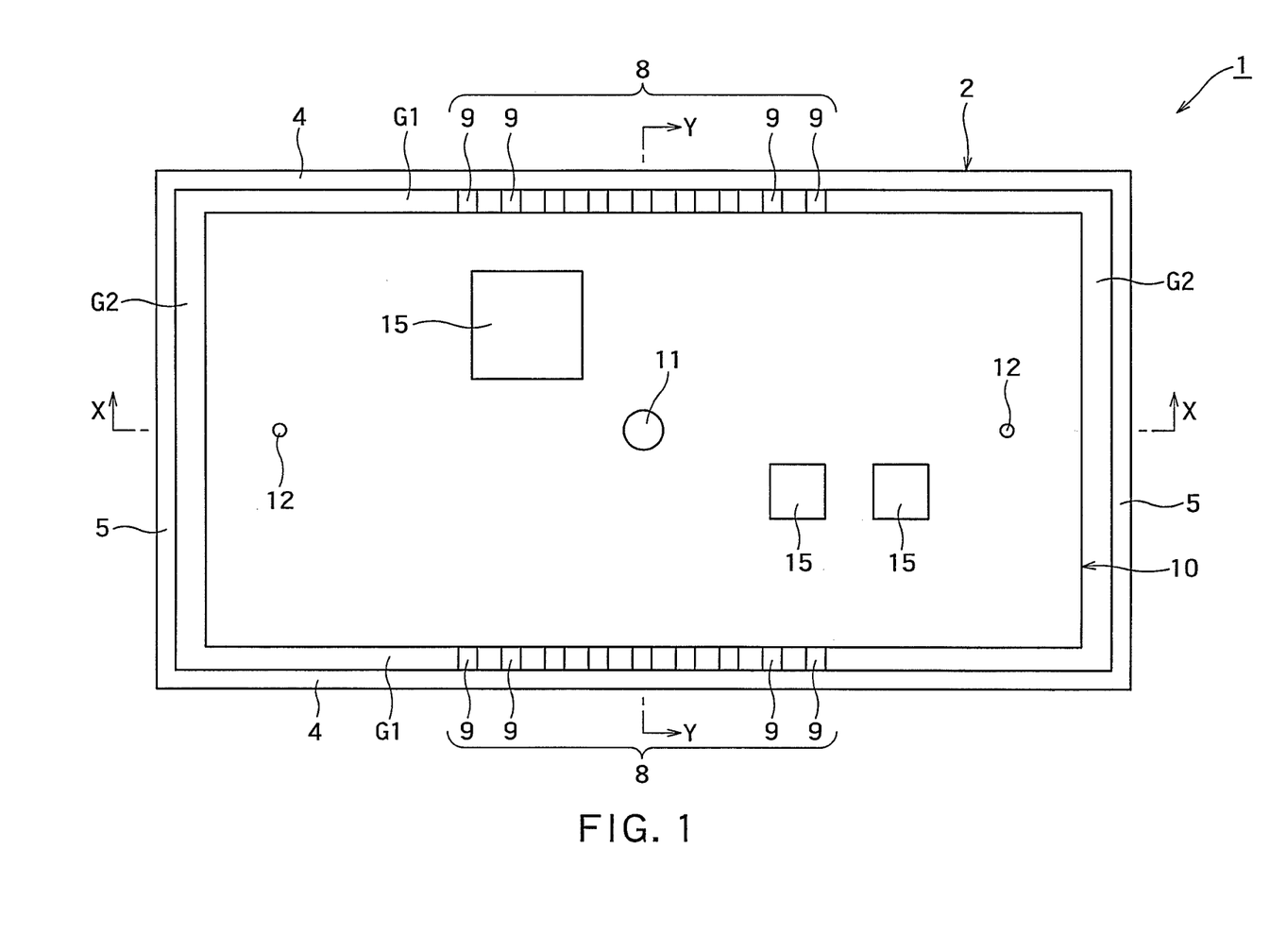
FIG. 1 is a plan view of electrical equipment 1 according to the first embodiment of the present invention.
Figure 2:
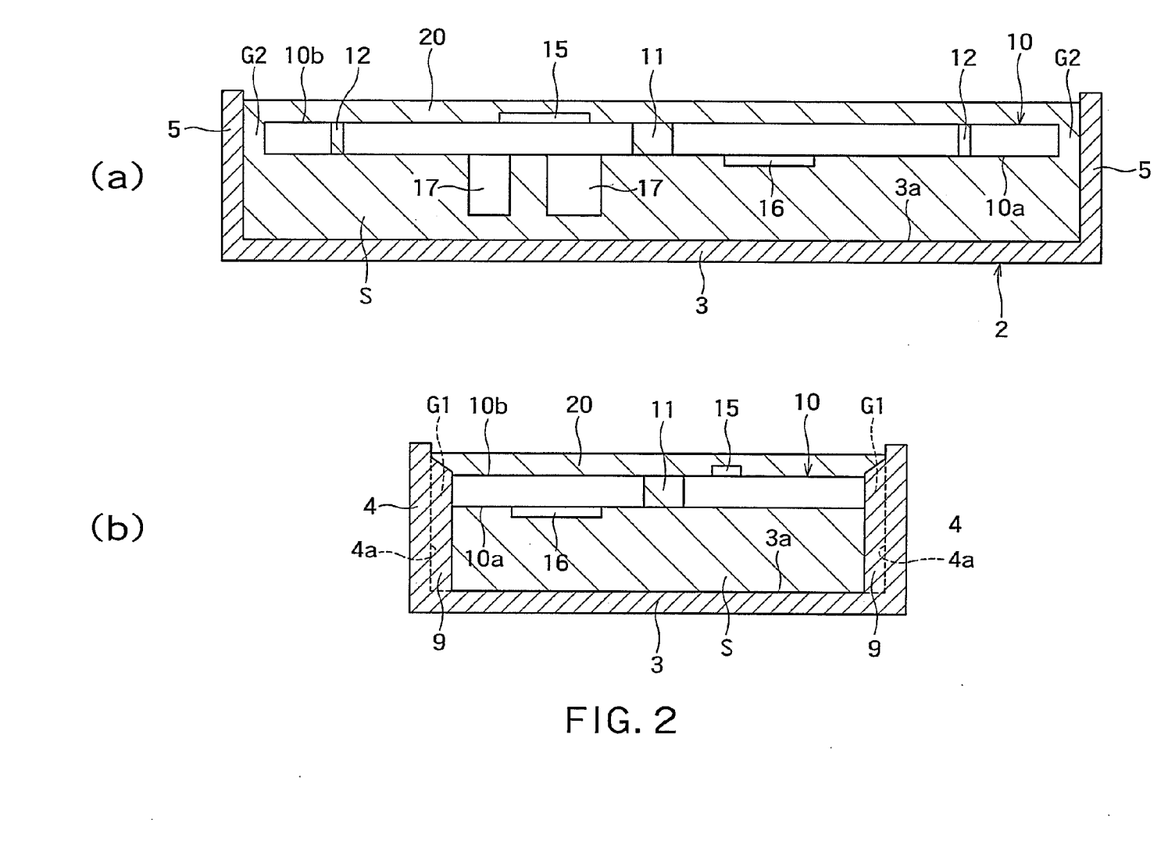
Figure 3:
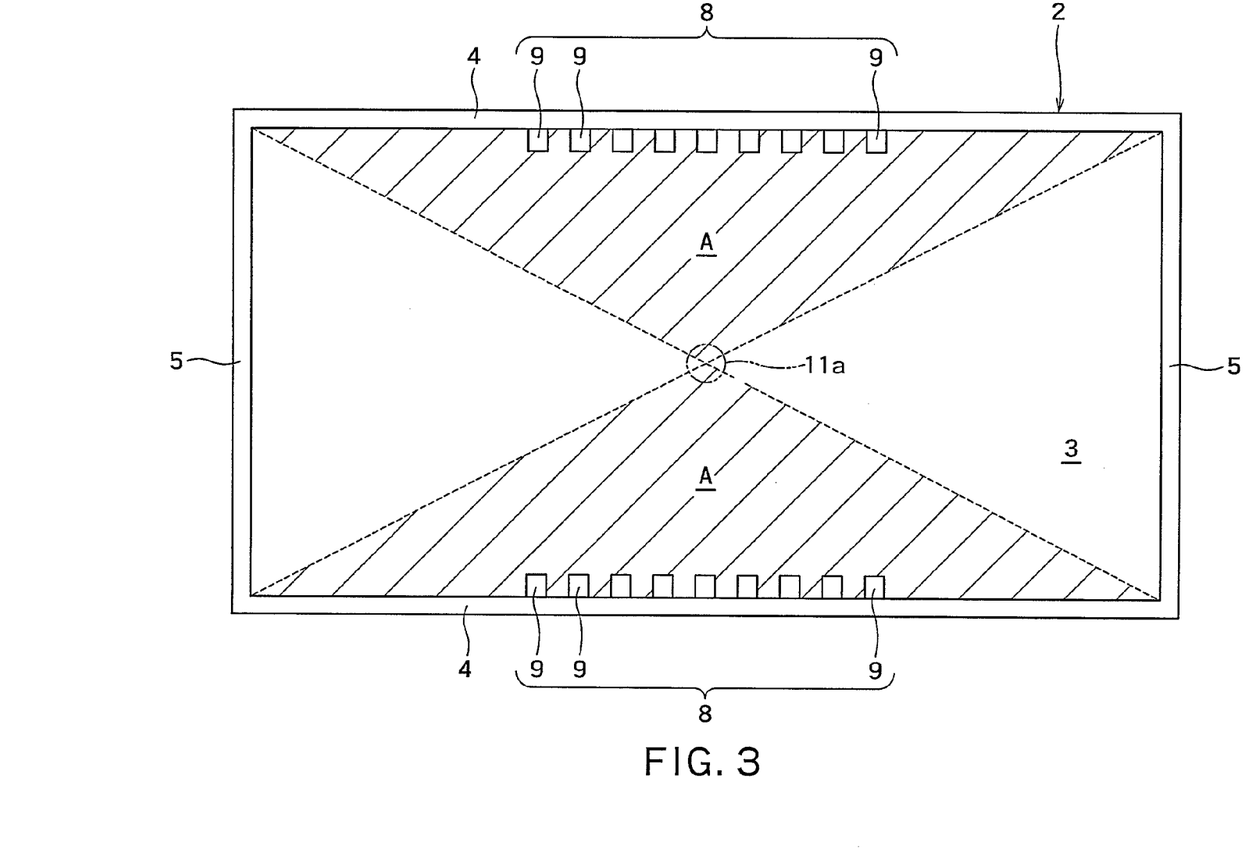
FIG. 3 is a plan view of a chassis 2 of the electrical equipment 1 according to the first embodiment.

The electrical equipment according to the first embodiment of the present invention is described with reference to FIGS. 1 to 3. FIG. 1 is a plan view of electrical equipment 1 according to the present embodiment. Also, in FIG. 1, a sealing resin 20 that embeds a printed circuit board 10 is omitted. FIG. 2(a) is a cross sectional view along the X-X line in FIG. 1, and FIG. 2(b) is a cross sectional view along the Y-Y line in FIG. 1. FIG. 3 illustrates a plan view of a chassis 2 of the electrical equipment 1. In FIG. 3, a projection line 11a denotes a projection line from a resin injection hole 11 of the printed circuit board 10 stored in the chassis to an inner surface 3a of a bottom portion 3 of the chassis 2.

As illustrated in FIGS. 1, 2(a) and (b), the electrical equipment 1 includes the chassis 2, the printed circuit board 10 stored in the chassis 2 and the sealing resin 20 that embeds the printed circuit board 10.

The chassis 2 has the bottom portion 3 and a plurality of side portions 4 and 5, and is opened upward.

As illustrated in FIG. 3, the chassis 2 has a substantially rectangular shape in plan view in the present embodiment. That is, the chassis 2 has a bottom portion 3 of a substantially rectangular shape, two side portions 4 connected with the long sides of the bottom portion 3 and two side portions 5 connected with the short sides of the bottom portion 3.

Here, the planar shape of the chassis 2 is not limited to the substantially rectangular shape, and may be, for example, other substantially polygonal shapes such as a substantially square shape and a substantially pentagonal shape. Moreover, for example, although the chassis 2 is formed with resins, it may be formed with other materials (such as metal).

In the printed circuit board 10, as illustrated in FIGS. 1, 2(a) and (b), the resin injection hole 11 that penetrates in the thickness direction is provided. As illustrated in FIG. 1, preferably, this resin injection hole 11 is provided in the central portion of the printed circuit board 10.

Here, as illustrated in FIGS. 1, 2(a) and (b), an air bubble escape hole 12 that penetrates through the printed circuit board 10 in the thickness direction may be provided. It is preferable to provide this air bubble escape hole 12 in a position between the resin injection hole 11 and the side portion 5 (which is a side portion different from the side portion 4 that is the closest side portion to the resin injection hole 11), where the position is close to the edge side of the printed circuit board 10. Moreover, the air bubble escape hole 12 may be provided as a through-hole via to electrically connect the wiring of a principal surface 10a of the printed circuit board 10 and the wiring of a principal surface 10b.

As illustrated in FIGS. 2(a) and (b), the printed circuit board 10 is stored in the chassis 2 such that the principal surface (lower surface) 10a faces the inner surface 3a of the bottom portion 3. The printed circuit board 10 is placed on a placement portion (such as a pedestal) provided in the bottom portion 3 or a rib 9 so as to keep a predetermined distance from the bottom portion 3 of the chassis 2.

Moreover, as illustrated in FIG. 1, gap G1 and gap G2 exist between the printed circuit board 10 and the chassis 2. Here, gap G1 denotes a gap between the edge side of the printed circuit board 10 and the side portion 4 of the chassis 2, and gap G2 denotes a gap between the edge side of the printed circuit board 10 and the side portion 5 of the chassis 2.

Various electronic parts 15, 16 and 17 are mounted on the printed circuit board 10. The electronic part 15 is mounted on the principal surface (upper surface) 10b of the printed circuit board 10 and denotes, for example, a chip for control, a semiconductor switch or a chip part (such as a resistance and a capacitor). The electronic part 16 is mounted on the principal surface (lower surface) 10a of the printed circuit board 10 and denotes, for example, a chip for control, a semiconductor switch (for example, MOSFET) or a chip part (such as a resistance and a capacitor). The electronic part 17 is mounted on the principal surface (lower surface) 10a of the printed circuit board 10 and denotes a tall electronic part (such as an electrolytic capacitor).

As illustrated in FIGS. 2(a) and (b), the sealing resin 20 is filled in internal space S formed by the chassis 2 and the printed circuit board 10. Further, the sealing resin 20 coats the principal surface (upper surface) 10b of the printed circuit board 10 and embeds the printed circuit board 10.

Next, a flow suppression portion 8 provided in the chassis 2 is described in detail. This flow suppression portion 8 decreases the drift velocity of the sealing resin 20 pressed into internal space S through the resin injection hole 11 before the sealing resin 20 is hardened, and is formed with a plurality of ribs 9 (described later) in the present embodiment.

As illustrated in FIG. 3, the flow suppression portion 8 is provided in at least part of predetermined region A in the inner surface (the inner surface 3a and 4a) of the chassis 2. Here, region A indicates a region from the portion immediately below the resin injection hole 11 in the inner surface 3a of the bottom portion 3 to an inner surface 4a of the side portion 4 that is the closest side portion to the resin injection hole 11 among the plurality of side portions of the chassis 2. That is, region A is formed with the region of an isosceles triangle shape in the inner surface 3a of the bottom portion 3 and the region of a rectangular shape in the inner surface 4a of the side portion 4.

In the present embodiment, as illustrated in FIGS. 1 and 3, the plurality of ribs 9 are provided in the inner surface 4a of the side portion 4 that is the closest side portion to the resin injection hole 11, as the flow suppression portion 8. In a case where the resin injection hole 11 is provided in the central portion of the printed circuit board 10 like the present embodiment, the plurality of ribs 9 as the flow suppression portion 8 are provided in each of two side portions 4. If the resin injection hole 11 is provided closer to one side portion 4, the plurality of ribs 9 are provided only in the inner surface 4a of this side portion 4. Thus, each rib 9 is provided in at least one side portion 4 corresponding to a long side out of the plurality of side portions 4 and 5 of the chassis 2.

As illustrated in FIGS. 1 and 2(b), each rib 9 is provided so as to be in contact with the inner surface 4a on the side portion 4 and stand from the inner surface 3a of the bottom portion 3 to the upside of the printed circuit board 10. In the present embodiment, as illustrated in FIG. 1, the width of the rib 9 and the interval between the ribs 9 are constant. The number of the ribs 9 is not limited to the number illustrated in FIG. 1.

Also, in FIG. 1, although the rib 9 is provided in the central region of gap G1, it is not limited to this. That is, the rib 9 may be provided in an arbitrary region of gap G1, centered on a portion that is the closest to the resin injection hole 11 in gap G1, according to the timing at which a resin pressed into internal space S springs out from gap G1.

Moreover, although the rib 9 is in contact with the edge side of the printed circuit board 10 in FIG. 1, it is not limited to this. That is, the rib 9 may not be in contact with the edge side of the printed circuit board 10 and a gap may exist between the rib 9 and the printed circuit board 10. It is possible to increase the pressure loss in a resin channel even if the rib 9 is not in contact with the edge side of the printed circuit board 10.

(Design Method of Electrical Equipment)

Next, a design method of the above-mentioned electrical equipment 1 is described. In the present design method, the above-mentioned flow suppression portion 8 that decreases the drift velocity of the resin pressed into the internal space is provided in the chassis storing the printed circuit board. To be more specific, the flow suppression portion 8 that decreases the drift velocity of the sealing resin 20 pressed into internal space S, which is formed by the chassis 2 and the printed circuit board 10 at the time of storing the printed circuit board 10 in the chassis 2, through the resin injection hole 11 before the sealing resin 20 is hardened, is provided in at least part of region A from the inner surface 3a of the bottom portion 3 immediately below the resin injection hole 11 to the inner surface 4a of the side portion 4 that is the closest to the resin injection hole 11 out of the plurality of side portions 4 and 5. By this means, it is possible to design the above-mentioned electrical equipment 1.

(Production Method of Electrical Equipment)

Next, a production method of the above-mentioned electrical equipment 1 is described.

First, the printed circuit board 10 and the chassis 2 are prepared. Subsequently, the printed circuit board 10 is stored in the chassis 2 such that the principal surface 10a faces the inner surface 3a of the bottom portion 3 of the chassis 2. To be more specific, the printed circuit board 10 is placed on the placement portion (such as a pedestal) provided in the bottom portion 3 or the rib 9 of the chassis 2.

Next, a resin (such as a hard potting resin) is pressed from the resin injection hole 11 of the printed circuit board 10, the electronic parts 15, 16 and 17 and the printed circuit board 10 are embedded with the resin and the resin is hardened afterwards.

To be more specific, the resin injection nozzle is inserted in the resin injection hole 11 and the resin is pressed into internal space S. The resin pressed from the resin injection hole 11 into internal space S flows like the tsunami that expands in a concentric fashion, and fills internal space S.

In the process of filling internal space S with the resin, the pressed resin expands in a concentric fashion, reaches the side portion 4 of the chassis 2 first, and spreads over the upside of the printed circuit board 10 through gap G1 between the edge side of the printed circuit board 10 and the side portion 4 of the chassis 2.

Since the plurality of ribs 9 are provided in the inner surface of the side portion 4, the area of gap G1 decreases and the pressure loss in a resin channel increases. As a result, the timing at which the resin pressed into internal space S spreads over the printed circuit board 10 through gap G1 is delayed.

By this means, the resin pressed into internal space S springs out through gaps G1 and G2 which are formed between the side portion 4 of the chassis 2 and the edge sides of the printed circuit board 10 at almost the same timing.

Therefore, it is possible to complete the filing of internal space S while avoiding that the resin is attached to the point of the resin injection nozzle.

When the resin filling of internal space S is completed, the resin injection nozzle is removed from the resin injection hole 11, the resin extraction is continued while keeping a predetermined interval from the printed circuit board 10, and the principal surface (upper surface) 10b of the printed circuit board 10 is coated with the resin.

Afterwards, the resin in the chassis 2 is hardened by heating or the like, and the sealing resin 20 is formed.

As described above, by providing the rib 9, the timing at which the resin pressed into internal space S springs out from gap G1 is delayed, and the resin springs out through gaps G1 and G2 at almost the same timing.

Therefore, according to the first embodiment, it is possible to avoid the situation that a resin is attached to the point of a resin injection nozzle and the resin injection cannot be continued. Further, according to the first embodiment, it is possible to avoid the situation that: the upper surface (the principal surface 10b) of the printed circuit board 10 is covered with the resin before the resin filling of internal space S is completed; and air bubbles remain in internal space S.

Also, in a case where the air bubble escape hole 12 is provided, since it is possible to let out the air to the outside from not only gaps G1 and G2 but also the air bubble escape hole 12 in the resin filling process of internal space S, it is possible to further suppress the generation of air bubbles in the resin filled in internal space S.

Therefore, according to the first embodiment, it is possible to suppress the generation of air bubbles in a sealing resin without a special apparatus and a new process such as residual heat and degassing.

Moreover, since the strength of the chassis 2 is reinforced by providing the plurality of ribs 9 in the inner surface of the side portion 4 of the chassis 2, it is possible to prevent the side portion 4 from falling outside of the chassis 2, and other situations. Especially, in a case where the chassis 2 has a substantially rectangular shape and the resin injection hole 11 is located in the central portion of the printed circuit board 10, it is convenient because the plurality of ribs 9 are provided in the side portion 4 of the long side with relatively weak strength instead of the side portion 5.

Moreover, it is possible to improve the adhesive strength between the chassis 2 and the sealing resin 20 by providing the plurality of ribs 9.

Next, two modified examples (modified example 1 and modified example 2) of the first embodiment are described. Each of the modified examples can acquire the operational effect similar to the first embodiment.

Modified Example 1

Figure 4:
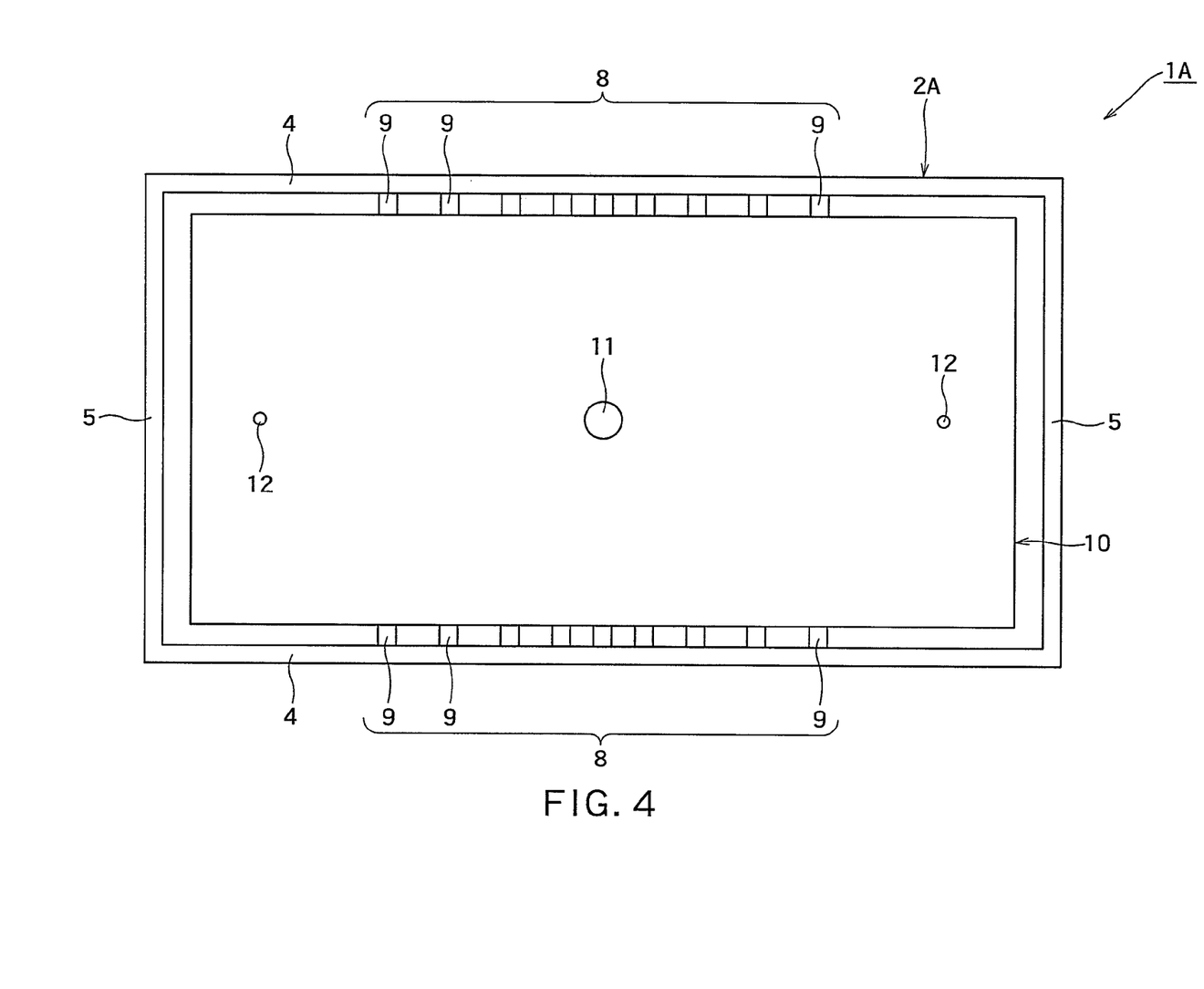
FIG. 4 is a plan view of electrical equipment 1A according to modified example 1 of the first embodiment.

Modified example 1 is described with reference to FIG. 4. FIG. 4 illustrates a plan view of electrical equipment 1A according to modified example 1. Here, in FIG. 4, the sealing resin 20 that embeds the printed circuit board 10 and the electronic part 15 are omitted.

In the present modified example, the interval between the ribs 9 is changed according to the distance between the rib 9 and the resin injection hole 11. To be more specific, as illustrated in FIG. 4, the plurality of ribs 9 are provided such that the interval between the ribs 9 becomes wider as they become more distant from the resin injection hole 11 in a chassis 2A of the electrical equipment 1A.

By doing this, since the pressure loss in a resin channel becomes larger in a region at which a resin arrives earlier in gap G1, it is possible to effectively adjust the timing at which the resin springs out.

Modified Example 2

Figure 5:
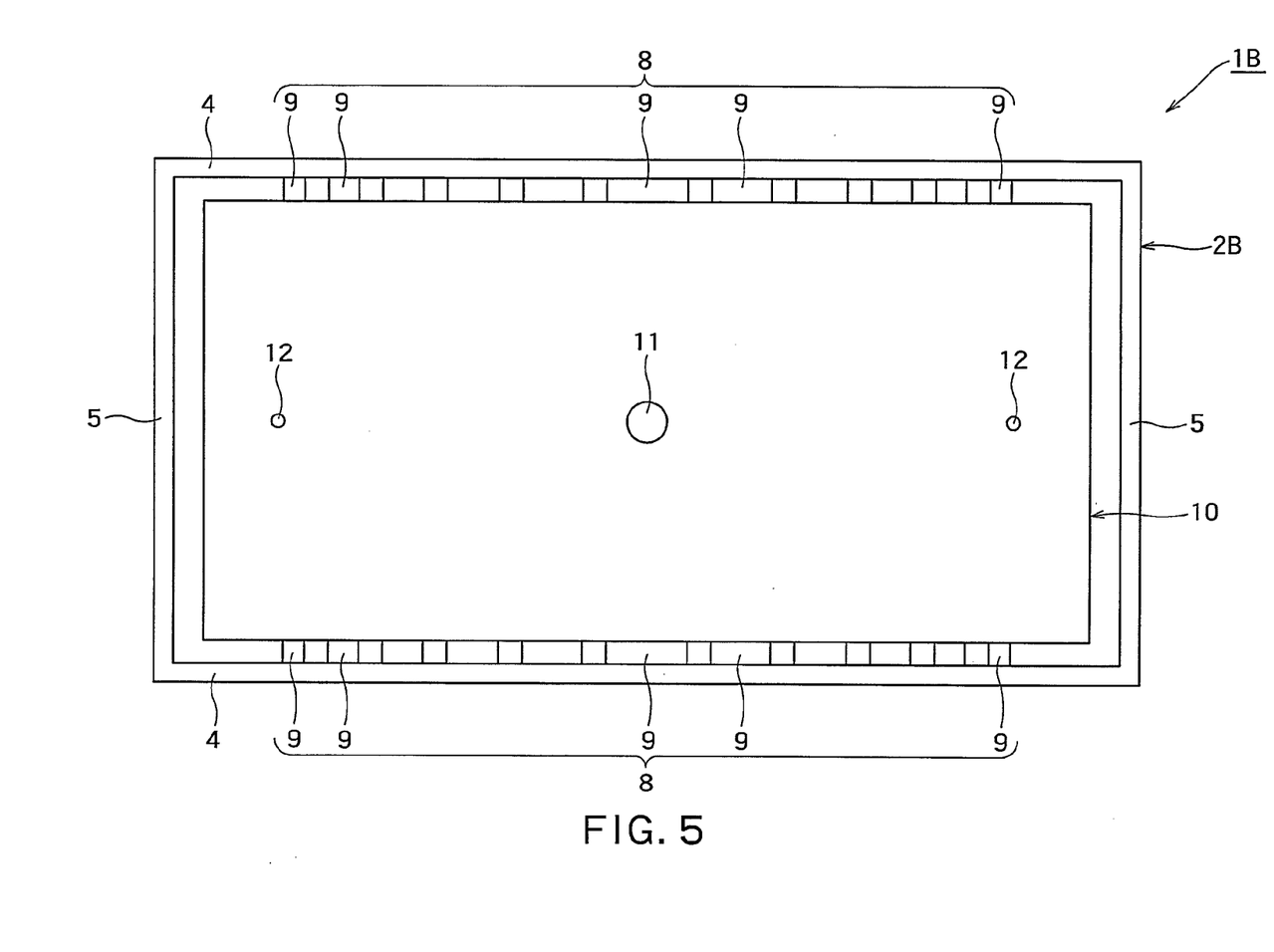
FIG. 5 is a plan view of electrical equipment 1B according to modified example 2 of the first embodiment.

Modified example 2 is described with reference to FIG. 5. FIG. 5 illustrates a plan view of electrical equipment 1B according to modified example 2. Here, in FIG. 5, the sealing resin 20 that embeds the printed circuit board 10 and the electronic part 15 are omitted.

In the present modified example, the width of the rib 9 is changed according to the distance between the rib 9 and the resin injection hole 11. To be more specific, as illustrated in FIG. 5, in the plurality of ribs 9 provided in a chassis 2B of the electrical equipment 1B, the width of the rib 9 becomes narrower as it becomes more distant from the resin injection hole 11.

By doing this, similar to modified example 1, since the pressure loss in a resin channel becomes larger in a region at which a resin arrives earlier in gap G1, it is possible to effectively adjust the timing at which the resin springs out.

(Second Embodiment)

Next, the electrical equipment according to the second embodiment of the present invention is described.

One of differences between the first embodiment and the second embodiment is the formation place of ribs. While the rib 9 is provided in the side portion 4 of the chassis 2 in the first embodiment, a rib 19 is provided in the bottom portion 3 of the chassis 2 in the second embodiment.

Figure 6:
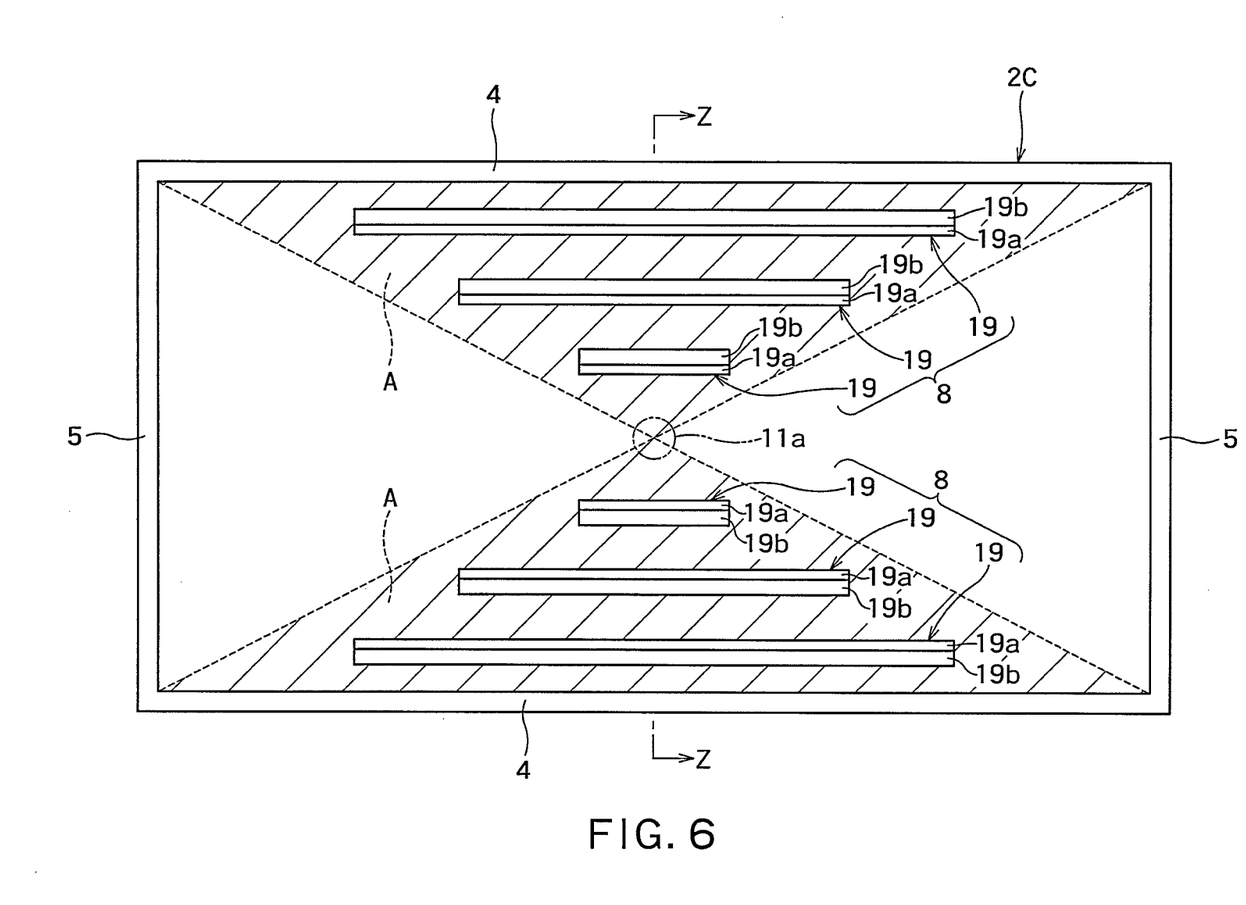
FIG. 6 is a plan view of a chassis 2C of electrical equipment according to the second embodiment of the present invention.

In the following, regarding the electrical equipment according to the second embodiment, the difference from the first embodiment is mainly described with reference to FIGS. 6 and 7. FIG. 6 illustrates a plan view of a chassis 2C of the electrical equipment according to the second embodiment and FIG. 7 illustrates a cross sectional view along the Z-Z line in FIG. 6.

In the present embodiment, as illustrated in FIG. 6, a plurality of ribs 19 are provided in the inner surface 3a of the bottom portion 3 of the chassis 2 as the flow suppression portion 8. Here, the number of the ribs 19 is not limited to the number illustrated in FIG. 6.

Figure 7:
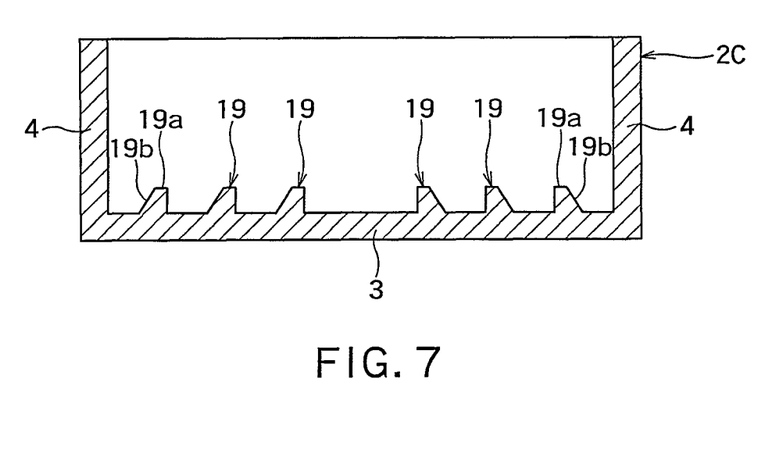
FIG. 7 is a cross sectional view along the Z-Z line in FIG. 6.

As illustrated in FIGS. 6 and 7, each rib 19 is in contact with the inner surface 3a of the bottom portion 3 of the chassis 2 and extends along the side portion 4 that is the closest side portion to the resin injection hole 11.

Moreover, as illustrated in FIGS. 6 and 7, each rib 19 has a top portion 19a and an inclination portion 19b. The inclination portion 19b is provided in an opposite side to a position immediately below the resin injection hole 11, and inclines from the top portion 19a toward the inner surface 3a of the bottom portion 3 of the chassis 2.

Thus, by inclining the side surface on the side opposite to the side immediately below the resin injection hole 11 among the side surfaces of the rib 19, it is possible to suppress the generation of air bubbles in the rib 19. To be more specific, in a case where the inclination portion 19b is not provided and the side surface on the opposite side to the side immediately below the resin injection hole 11 stands from the inner surface of the bottom portion 3, when a resin that expands in a concentric fashion from the position immediately below the resin injection hole 11 passes through the rib 19, air bubbles occur in the side surface. By contrast with this, in a case where the inclination portion 19b is provided in the rib 19, it is possible to suppress the generation of air bubbles in the rib 19.

By providing the rib 19 in the bottom portion 3 of the chassis 2 as described above, since the speed at which a resin pressed into internal space S flows toward the side portion 4 decreases, the timing at which the resin springs out upward through gap G1 is delayed.

By this means, as described in the first embodiment, it is possible to complete the filling of internal space S while avoiding that the resin is attached to the point of the resin injection nozzle.

Therefore, according to the second embodiment, it is possible to avoid the situation that a resin is attached to the point of a resin injection nozzle and the resin injection cannot be continued. Further, according to the second embodiment, it is possible to avoid the situation that: the upper surface (the principal surface 10b) of the printed circuit board 10 is covered with the resin before the resin filling of internal space S is completed; and air bubbles remain in internal space S.

Therefore, according to the second embodiment, it is possible to suppress the generation of air bubbles in a sealing resin without a new process and a special apparatus.

Moreover, it is possible to improve the adhesive strength between the chassis 2 and the sealing resin 20 by providing the plurality of ribs 19.

Two embodiments according to the present invention have been described above.

The flow suppression portion in the electrical equipment of the present invention is not limited to the above-mentioned ribs 9 and 19, and it may be the one that decreases the drift velocity of a resin pressed into an internal space through a resin injection hole. For example, as a flow suppression portion, concavities and convexities formed by surface texturing may be provided in the inner surface 3a and/or the inner surface 4a of the chassis 2. Moreover, the flow suppression portion may be formed by combining the concavities and convexities formed by surface texturing and the rib.

Moreover, since the corner portion of the chassis 2 is a part in which the resin filling is most delayed, the timing of the resin filling may be controlled by devising the shape of the chassis 2. To be more specific, with respect to the chassis 2 of a substantially polygonal shape in plan view, the depth of the corner portion of the chassis 2 is made shallower than the central portion of the bottom portion 3. By this means, it is possible to advance the timing at which a resin pressed into internal space S reaches the corner portion of the chassis 2, and fully fill the resin even in the corner portion of the chassis 2.

Moreover, the flow suppression portion 8 may be provided in consideration of the size (height or width, and so on) of the electronic parts 16 and 17 mounted on the principal surface 10a of the printed circuit board 10. For example, since the drift velocity of a resin passing through the electronic part 17 decreases in a case where the tall electronic part 17 such as an electrolytic capacitor is mounted on the printed circuit board 10, the flow suppression portion 8 is provided in the chassis 2 in consideration of that. By this means, it is possible to control the speed of a resin that flows in internal space S at higher accuracy.

Although those skilled in the art may conceive of additional effects or various modifications of the present invention on the basis of the above-mentioned description, aspects of the present invention are not limited to above-mentioned individual embodiments. Components over different embodiments may be arbitrarily combined. It is possible to make various additions, changes and partial deletion without departing from the conceptual idea and scope of the present invention derived from the content defined in the claims and the equivalent thereof.

REFERENCE SIGNS LIST 1, 1A, 1B electrical equipment
2, 2A, 2B, 2C chassis
3 bottom portion
3a inner surface (of bottom portion)
4, 5 side portion
4a, 5a inner surface (of side portion)
8 flow suppression portion
9 rib (of chassis side portion)
10 printed circuit board
10a, 10b principal surface
11 resin injection hole
11a projection line (of resin injection hole)
12 air bubble escape hole
15, 16, 17 electronic part
19 rib (of chassis bottom portion)
19a top portion
19b inclination portion
20 sealing resin
A region
G1, G2 gap
S internal space

The invention claimed is:

1. Electrical equipment comprising:
a chassis that has a bottom portion and a plurality of side portions and is opened upward;
a printed circuit board in which a resin injection hole that penetrates in a thickness direction is provided, and that is stored in the chassis such that one principal surface faces an inner surface of the bottom portion;
a sealing resin that is filled in an internal space formed by the chassis and the printed circuit board, coats the other principal surface of the printed circuit board and embeds the printed circuit board; and
a flow suppression portion that decreases a drift velocity of the sealing resin pressed into the internal space through the resin injection hole before the sealing resin is hardened, and that is provided in at least part of a region from a position immediately below the resin injection hole in the inner surface of the bottom portion to an inner surface of a side portion closest to the resin injection hole among the plurality of side portions.

2. The electrical equipment according to claim 1, wherein a plurality of ribs that are in contact with the inner surface of the side portion closest to the resin injection hole and extend to an upper side of the printed circuit board along a direction in which the side portion stands from the bottom portion are provided as the flow suppression portion.

3. The electrical equipment according to claim 2, wherein an interval between the ribs becomes wider with increasing distance from the resin injection hole.

4. The electrical equipment according to claim 2, wherein a width of the rib becomes narrower with increasing distance from the resin injection hole.

5. The electrical equipment according claim 2, wherein the chassis has a substantially rectangular shape in plan view, the resin injection hole is provided in a central portion of the printed circuit board and the plurality of ribs are provided in at least one side portion corresponding to a long side among the plurality of side portions of the chassis.

6. The electrical equipment according to claim 1, wherein a rib that is in contact with the inner surface of the bottom portion of the chassis and extends along the side portion closest to the resin injection hole is provided as the flow suppression portion.

7. The electrical equipment according to claim 6, wherein the rib has a top portion and an inclination portion that is provided in an opposite side to a position immediately below the resin injection hole and inclines from the top portion toward the inner surface of the bottom portion of the chassis.

8. The electrical equipment according to claim 1, wherein concavities and convexities formed by surface texturing are provided in the inner surface of the chassis as the flow suppression portion.

9. The electrical equipment according to claim 1, wherein an air bubble escape hole that penetrates through the printed circuit board in a thickness direction is provided near an edge side of the printed circuit board, between the resin injection hole and a side portion different from the side portion closest to the resin injection hole.

10. The electrical equipment according to claim 1, wherein the chassis has a substantially polygonal shape in plan view and a depth of a corner portion of the chassis is shallower than a central portion of the bottom portion.

11. The electrical equipment according to claim 1, wherein an electronic part is mounted on the one principal surface of the printed circuit board and the flow suppression portion is provided in consideration of a size of the electronic part.

12. A production method of electrical equipment comprising:
preparing a printed circuit board in which a resin injection hole that penetrates in a thickness direction is provided and an electronic part is mounted on one principal surface;
preparing a chassis that has a bottom portion and a plurality of side portions and is opened upward, where a flow suppression portion that decreases a drift velocity of a resin pressed into an internal space, which is formed by the chassis and the printed circuit board when the printed circuit board is stored, through the resin injection hole is provided in at least part of a region from an inner surface of the bottom portion immediately below the resin injection hole to an inner surface of a side portion closest to the resin injection hole among the plurality of side portions;
storing the printed circuit board in the chassis such that the one principal surface faces the inner surface of the bottom portion; and
a sealing step of pressing a resin through the resin injection hole and hardening the resin after embedding the electronic part and the printed circuit board with the resin.

13. The production method of the electrical equipment according to claim 12, further comprising using a chassis in which a plurality of ribs that are in contact with the inner surface of the side portion closest to the resin injection hole in a state where the printed circuit board is stored in the chassis and that stand from the inner surface of the bottom surface to an upper side of the printed circuit board are provided as the flow suppression portion.

14. A design method of electrical equipment comprising a chassis that has a bottom portion and a plurality of side portions and is opened upward, a printed circuit board in which a resin injection hole that penetrates in a thickness direction is provided, and that is stored in the chassis such that one principal surface faces an inner surface of the bottom portion, and a sealing resin that is filled in the chassis and embeds the printed circuit board, where a flow suppression portion that decreases a drift velocity of the sealing resin pressed into an internal space, which is formed by the chassis and the printed circuit board when the printed circuit board is stored in the chassis, through the resin injection hole before the sealing resin is hardened, is provided in at least part of a region from the inner surface of the bottom portion immediately below the resin injection hole to an inner surface of a side portion closest to the resin injection hole among the plurality of side portions.

15. The design method of the electrical equipment according to claim 14, wherein a plurality of ribs that are in contact with the inner surface of the side portion closest to the resin injection hole and stand from the inner surface of the bottom portion to an upper side of the printed circuit board are provided as the flow suppression portion.

* * * * *